(12) United States Patent
Burris et al.

(10) Patent No.: US 10,519,028 B2
(45) Date of Patent: Dec. 31, 2019

(54) SADDLE LIFT FOR INDIVIDUALS WITH SPECIAL NEEDS AND OTHERS

(71) Applicant: WISYS Technology Foundation, Inc., Madison, WI (US)

(72) Inventors: Shanna Arline Burris, North St. Paul, MN (US); Dean Ivan Olson, River Falls, WI (US)

(73) Assignee: WiSys Technology Foundation, Inc., Madison, WI (US)

( * ) Notice: Subject to any disclaimer, the term of this patent is extended or adjusted under 35 U.S.C. 154(b) by 263 days.

(21) Appl. No.: 15/669,240

(22) Filed: Aug. 4, 2017

(65) Prior Publication Data

US 2018/0037453 A1    Feb. 8, 2018

Related U.S. Application Data

(60) Provisional application No. 62/370,942, filed on Aug. 4, 2016.

(51) Int. Cl.
| | |
|---|---|
| *B68C 1/00* | (2006.01) |
| *A63B 71/00* | (2006.01) |
| *F16M 13/02* | (2006.01) |
| *F16M 11/04* | (2006.01) |
| *F16M 11/20* | (2006.01) |
| *F16M 11/42* | (2006.01) |

(52) U.S. Cl.
CPC .............. *B68C 1/002* (2013.01); *A63B 71/00* (2013.01); *B68C 1/00* (2013.01); *F16M 11/046* (2013.01); *F16M 11/2092* (2013.01); *F16M 11/425* (2013.01); *F16M 13/027* (2013.01); *A63B 2244/24* (2013.01)

(58) Field of Classification Search
CPC .... B68B 5/00; B68B 5/06; B68B 9/00; B68C 1/002; B68C 2001/022; B65G 7/12; B65G 9/002; B65G 9/004; B65G 47/90; B65G 47/901; B65G 47/907; A63B 71/0009; A63B 2071/0018; A63B 71/0036; A63B 2244/24; F16M 11/046; F16M 11/2092; F16M 22/425; F16M 13/027
USPC ..... 54/84, 1; 212/71, 76, 77, 78, 79, 80, 81, 212/87, 106, 336, 337, 338
See application file for complete search history.

(56) References Cited

U.S. PATENT DOCUMENTS

| | | | | |
|---|---|---|---|---|
| 220,218 A | * | 10/1879 | Burrows | .................. B66C 7/00 212/337 |
| 552,668 A | * | 1/1896 | Murphy | .................... A01J 5/04 54/84 |
| 560,753 A | * | 5/1896 | Provost | ..................... A01J 5/04 54/84 |
| 596,176 A | * | 12/1897 | Naylor | ................. A47F 5/0892 211/117 |

(Continued)

*Primary Examiner* — Lisa L Tsang
(74) *Attorney, Agent, or Firm* — Boyle Fredrickson S.C.

(57) ABSTRACT

A lift system includes a block and tackle pulley system movable along a track and carrying first and second hooks at a common attachment axis. The first hook is attached at a front end of the saddle while the second hook is attached to the back end of the saddle. Once the saddle is lowered onto the horse the inward tension of the hooks caused by the weight of the saddle is released allowing the hooks to be removed from the saddle without human intervention. The lift system accommodates a range of saddle sizes and weights.

14 Claims, 6 Drawing Sheets

(56) References Cited

U.S. PATENT DOCUMENTS

| | | | | |
|---|---|---|---|---|
| 733,190 | A * | 7/1903 | Griesser | B66C 1/24 |
| | | | | 212/80 |
| 787,569 | A * | 4/1905 | French | B66C 13/00 |
| | | | | 212/117 |
| 873,549 | A * | 12/1907 | Hof | A01J 5/04 |
| | | | | 54/84 |
| 1,061,366 | A * | 5/1913 | Frazier | A01J 5/04 |
| | | | | 54/84 |
| 1,177,643 | A * | 4/1916 | Lymburner | A01J 5/04 |
| | | | | 54/84 |
| 1,328,312 | A * | 1/1920 | Bean | 54/84 |
| 3,828,521 | A * | 8/1974 | Dulaney | B68C 1/14 |
| | | | | 54/23 |
| 10,302,250 | B1 * | 5/2019 | Giraldo | F16M 13/022 |
| 2014/0138340 | A1 * | 5/2014 | Miller | B66D 3/04 |
| | | | | 212/336 |
| 2016/0015591 | A1 * | 1/2016 | Amer | A63B 21/00181 |
| | | | | 482/143 |
| 2016/0152453 | A1 * | 6/2016 | Wescott | B66D 3/04 |
| | | | | 182/3 |
| 2019/0159952 | A1 * | 5/2019 | Keibel | A63B 69/0064 |

* cited by examiner

SADDLE LIFT FOR INDIVIDUALS WITH SPECIAL NEEDS AND OTHERS

CROSS REFERENCE TO RELATED APPLICATION

This application claims priority to U.S. provisional application No. 62/370,942, filed Aug. 4, 2016, and hereby incorporated by reference.

STATEMENT REGARDING FEDERALLY SPONSORED RESEARCH OR DEVELOPMENT

This invention was made with government support under P217A120217 awarded by the US Department of Education. The government has certain rights in the invention.

BACKGROUND OF THE INVENTION

The present invention relates to a lift system for lifting a saddle onto a horse, for example, during equine-assisted therapy.

Equine-assisted therapy or hippotherapy assists persons with special needs including physical, cognitive, and emotional health problems using therapies that involve interactions with horses and other equines. One of the challenges for individuals is lifting the saddle onto the horse. Western saddles can weigh as much as 45-50 pounds. Lifting the saddle onto a horse which is 4 to 6 feet tall requires strength and coordination that makes the saddling process a challenge for many.

SUMMARY OF THE INVENTION

Currently available lift mechanisms are not specifically tailored for saddles and do not allow a saddle to be lifted into place and then released upon installation. The present invention assists the individual in lifting the saddle from a saddle rack and positioning the saddle above the horse that is then lowered onto the horse's back by the user. The present inventors have determined that hooks which release when tension is released upon saddling allows a user to self-install the saddle onto a horse with minimal assistance.

The present invention allows individuals with special needs to not only participate in horseback riding but also interactions with the horse before and after horseback riding to encourage bonding and promote the development of skills. These types of non-riding activities, which may also include grooming, feeding and other ground exercises, helps the individual in social, emotional, cognitive, and behavioral therapies.

The present invention accordingly provides a lift system movable along a track and having a block and tackle system carrying first and second hooks at a common attachment axis. The first hook is attached at a front end of the saddle while the second hook is attached to the back end of the saddle. Once the saddle is lowered onto the horse the inward tension of the hooks caused by the weight of the saddle is released allowing the hooks to be removed from the saddle. The lift system accommodates a range of saddle sizes and weights.

In one embodiment, the present invention may be a method of assisting individuals with special needs with saddling a horse during equine-assisted therapy, the method comprising the steps of (a) positioning a horizontal track above a staging area sized to permit a standing horse with one end of the track positioned near a saddle storage area, the track having a sliding carriage movable along the track, the sliding carriage supporting a block and tackle having an upper pulley attached to the sliding carriage and a lower pulley attached to a pair of pendant hooks; (b) maneuvering the sliding carriage over the saddle storage area and lowering the block and tackle so that the hooks may engage with the saddle in the saddle storage area; (c) raising the saddle using the block and tackle; (d) positioning the sliding carriage over a horse standing in the staging area and lowering the block and tackle to position the saddle on the horse; and (e) disengaging the hooks from the saddle. Steps (b)-(c) may be accomplished by an individual holding a single rope of the block and tackle.

It is thus a feature of at least one embodiment of the invention to allow an individual with special needs to participate in lifting a heavy and large saddle onto a horse with minimal assistance.

The method may further include the step of attaching a strap between the breast collar D rings of the saddle to form a loop wherein the loop is configured to receive at least one of the hooks.

It is thus a feature of at least one embodiment of the invention to configure the saddle for receiving the hooks of the lift system in a manner which allows for ease of hooking and unhooking. It is also a feature to utilize common preexisting parts of a saddle for hooking and unhooking the saddle without requiring the user to install additional elements.

A first front hook may be positioned near the front of the saddle oriented with its point directed outward with respect to a center of the saddle.

It is thus a feature of at least one embodiment of the invention to direct the point of the front hook away from the saddle body to prevent damage.

A second rear hook may be positioned near the rear of the saddle oriented with its point direct toward a center of the saddle. The second rear hook may have a shank extending along a first axis to a bend that curves the hook to an end extending along an axis substantially perpendicular to the first axis and a tip that is bent backward toward an outer edge of the bend to provide a non-pointed end. The second hook may be sized to engage the rear edge of the cantle of the saddle.

It is thus a feature of at least one embodiment of the invention to allow the hook to be pointed toward a center of the saddle without damaging the saddle with the point of the hook.

The points of the pair of hooks may be oriented in a same direction when hooked onto the saddle.

It is thus a feature of at least one embodiment of the invention to allow the tension of one hook to be released from the saddle first thus assisting in the automatic release of the second hook from the saddle.

The pair of hooks may be coupled to the block and tackle at a common axis.

It is thus a feature of at least one embodiment of the invention to create downward and inward tension toward a center of the saddle.

The method may further include the step of adjusting a distance between at least one of the hooks and the axis.

It is thus a feature of at least one embodiment of the invention to allow the tension of the hooks on the saddle to be adjusted depending on the size, shape, and weight of the saddle.

The upper pulley may include a cam and may further include the step of passing the single rope through the cam to allow movement of the single rope in one direction and prevent movement of the single rope in an opposite direction.

It is thus a feature of at least one embodiment of the invention to allow the individual to lift or lower the saddle in increments without requiring constant force on the rope during lifting or lowering where strength may be an issue.

The method may further include the step of positioning the individuals with special needs operating the block and tackle pulley with respect to the track such that a vector formed from the individual to the block and tackle pulley is 45 to 90 degrees with respect to an axis formed by the length of the track.

It is thus a feature of at least one embodiment of the invention to prevent sliding of the lift system along the pulley during lifting or lowering of the saddle.

A weight of the saddle may produce an inward force between the pair of hooks when the saddle is lifted above the ground.

It is thus a feature of at least one embodiment of the invention to allow the tension of the hooks to automatically release upon saddling the horse.

These particular objects and advantages may apply to only some embodiments falling within the claims and thus do not define the scope of the invention.

DETAILED DESCRIPTION OF THE PREFERRED EMBODIMENT

Figure 1:
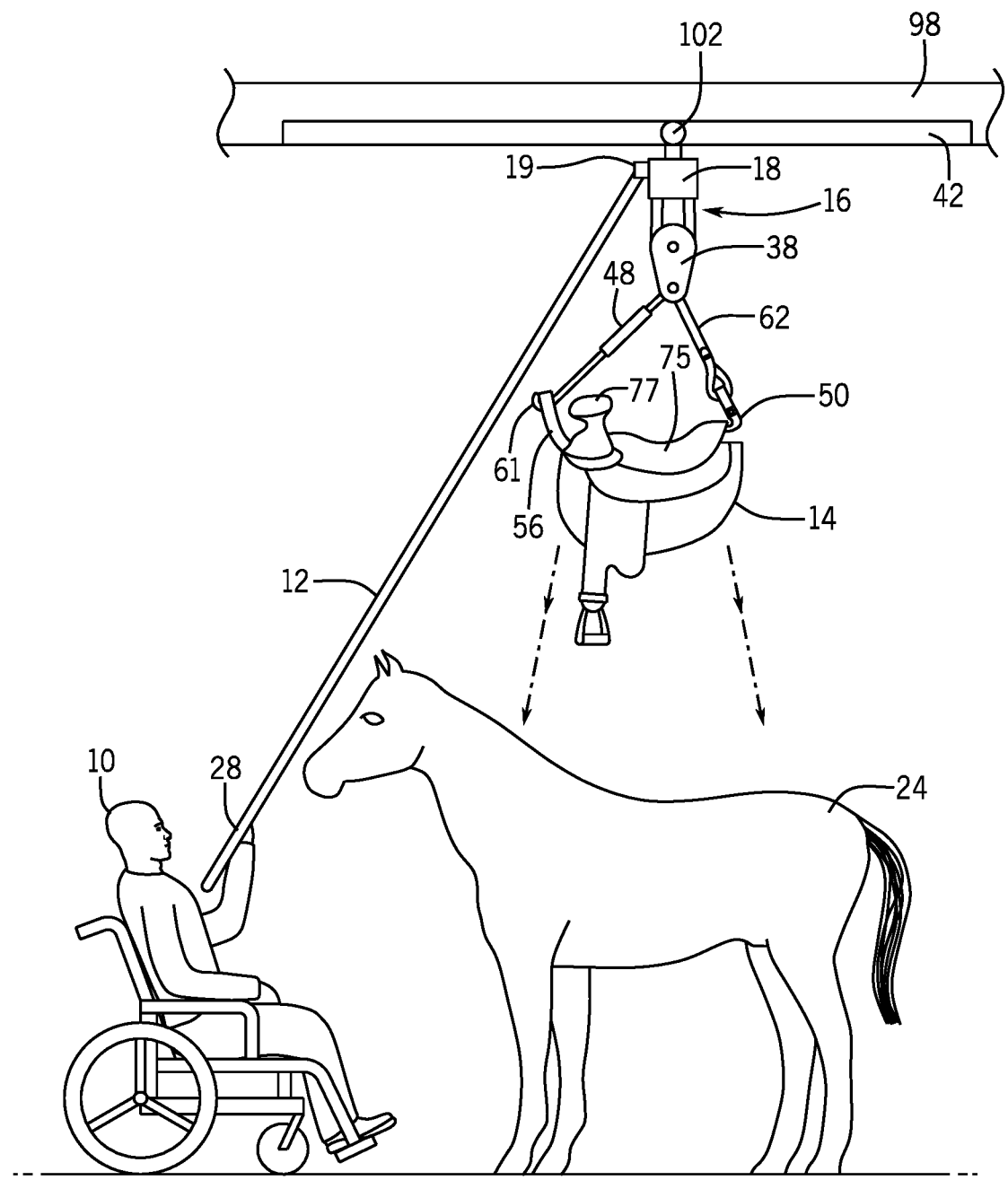
FIG. 1 is a simplified depiction of a lift system of the present invention being used to lift and lower a saddle onto a horse by a user.

Referring initially to FIG. 1, a user 10 may hold a first end 28 of a single rope 12 of lift system 80 to assist in lifting and lowering a saddle 14 at an opposite second end 30 of the rope 12 onto a horse 24. The saddle 14 may be any type of saddle, for example, western saddle or dressage saddle, having a length of approximately 15 to 18 inches depending on the rider's size. The saddle 14 provides a seat 75 with a pommel horn 77 at a front end and a cantle hinder 74 extending upwardly at a rear of the seat 75. The front end of the saddle 14 may support a breast collar 49 extending across the horse's neck for keeping the saddle 14 in place.

Figure 4:
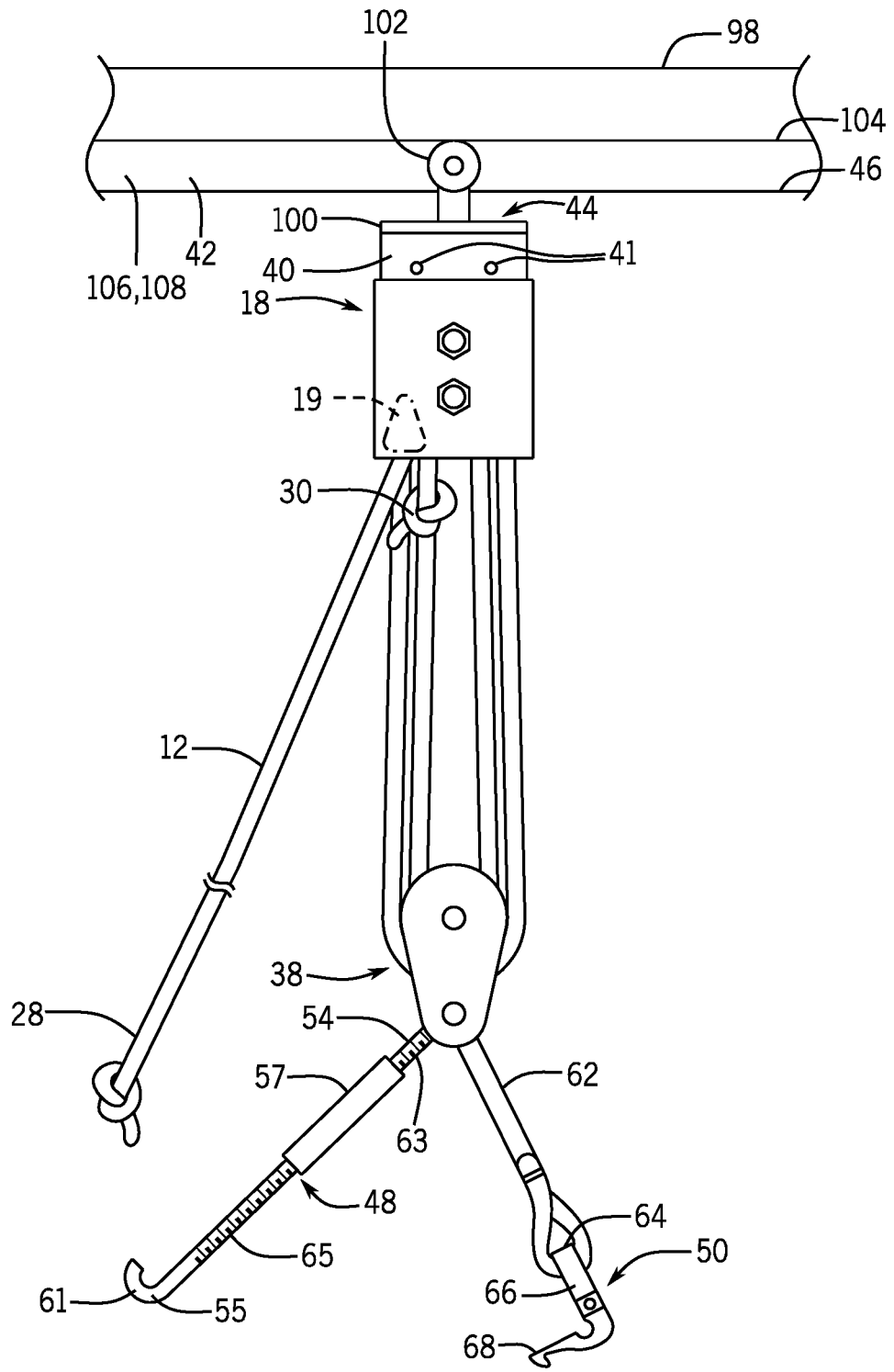
FIG. 4 is front elevation view of the pulley assembly of the present invention showing the upper and lower pulley of the block and tackle system.
Figure 5:
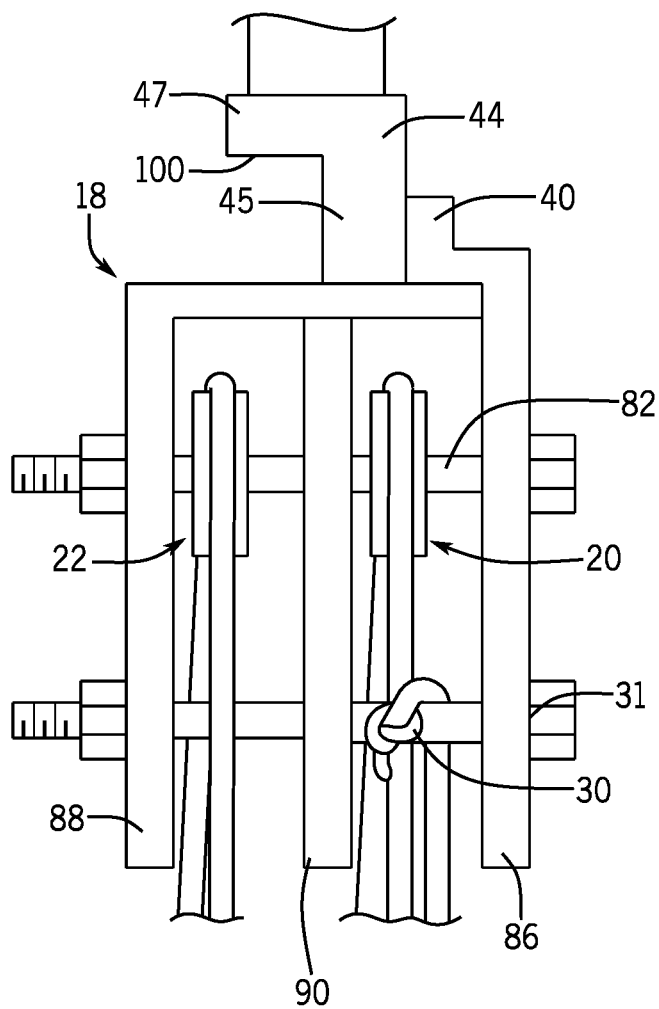
FIG. 5 is a side elevation view showing the upper pulley of the block and tackle system of FIG. 4.
Figure 6:
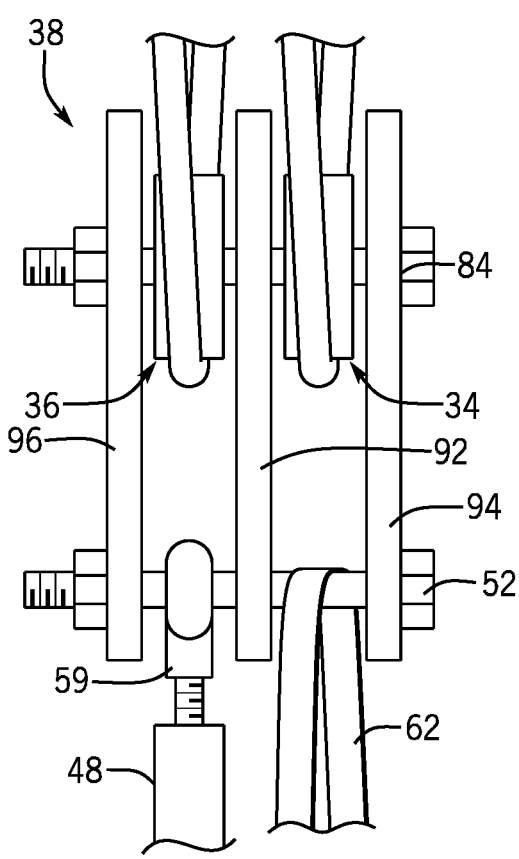
FIG. 6 is a side elevation view showing the lower pulley of the block and tackle system of FIG. 4.

The rope 12 may be any standard rope such as a nylon rope. The rope 12 is threaded into a pair of block housings 18, 38 to define a block and tackle system 16. Referring also to FIGS. 4, 5 and 6, the block and tackle system 16 provides a first set of pulleys 20, 22 mounted on a first single axle 82. The first pulley 20 and second pulley 22 are attached to the upper block housing 18 enclosing the pulleys 20, 22 by front 86 and rear 88 walls and separated by divider wall 90. A second set of pulleys 34, 36 is arranged below the first set of pulleys 20, 22 and mounted on a second single axle 84. The third pulley 34 and fourth pulley 36 are attached to the lower block housing 38 enclosing the pulleys 34, 36 by front 94 and rear 96 walls and separated by divider wall 92. The rope 12 is passed through the first pulley 20, followed by the third pulley 34, followed by the second pulley 22, followed by the fourth pulley 26, and then the second end 30 of the rope 12 is tied to a screw bolt 31 extending between the front 86 and rear 88 walls of the upper block housing 18. While the pulley described above relates to a double tackle arrangement with four pulleys arranged within two block housings, there are various arrangements of pulleys and their respective housings which may be implemented to afford a mechanical advantage. For example, the block and tackle system 16 may include two, three, five or six pulleys arranged within two or more blocks. The number of pulleys within each block may be the same or differ between blocks.

The upper block housing 18 may include a spring-loaded cam 19 or cam 19 with teeth allowing the rope 12 to pass through the cam 19 before exiting the upper block housing 18. The cam 19 allows movement of the rope 12 when pulled by the user but grips the rope 12 to prevent movement in the opposite direction such as from the load placed on the second end 30. Movement in the opposite direction may be permitted when the rope 12 is pulled at an angle, similar to the mechanism found in window blinds.

Referring now to FIGS. 4 and 5, the upper block housing 18 provides an attachment flange 40 extending upwardly from the upper block housing 18 and allowing the upper block housing 18 to be connected to an immovable structure such as a hanger door 98 or ceiling beam. The attachment flange 40 of block housing 18 provides holes 41 allowing the upper block housing 18 to be screwed to a sliding carriage 44. The sliding carriage 44 provides an L-shaped bracket 100 formed by a side edge 45 connected at a generally right angle to top edge 47. The bracket 100 is attached to the upper block housing 18 at the side edge 45 and has an upwardly extending roller or wheel 102 extending from the top edge 47 for interconnection to a track 42. The wheel 102 is pivotable with respect to the L-shaped bracket 100 to allow the upper block housing 18 to rotate 180° when the wheel 102 is inserted into the track 42. The wheel 102 may provide an outer cylindrical periphery having a hardened steel surface or a hard rubber or nylon wheel with metal bearings for quitter rolling.

The track 42 may extend horizontally at least 6 feet long along the length of a hanger door 98. The track 42 may be a "C-track" providing an elongated passage along a length of the track 42 and having a substantially rectangular cross section. The passage is enclosed by an upper wall 104, left 106 and right 108 side walls, and left and right flanged edges 46 extending inwardly from a bottom edge of the left 106 and right 108 side walls, respectively, retaining the wheel 102 of the sliding carriage 44 installed therein allowing the sliding carriage 44 to slide along the track 42 while also being held within the track 42. The track 42 may be mounted onto the hanger door 98, for example, at one of the sidewalls 106, 108 using screws or fasteners. The track 42 may be made of stainless steel.

Although the track 42 is shown to provide movement of the upper block housing 18 along one axis, the track 42 may be coupled to one or more additional tracks to provide movement in more than one direction and along more than one axis. The track 42 may also provide movement along a curved path instead of a straight path.

The wheel 102 may also be motorized to move along the track 42 with a motor instead of manually maneuvered. The wheel 102 may include a locking mechanism preventing movement along the track 42 when desired, for example, when lifting or lowering the saddle 14 to stop the wheel 102 from sliding.

Referring to FIGS. 4 and 6, the lower block housing 38 provides a bolt 52 extending between the front 94 and rear 96 walls for attachment and carrying of a load at a common attachment axis provided by bolt 52. Attached to the bolt 52 of the lower block housing 38 are a hook and eye turnbuckle 48 for attachment to a front end of the saddle 14 and leather belt 62 with a truck hook 50 for attachment to a rear end of the saddle 14.

The hook and eye turnbuckle 48 provides a first end having an eye bolt 54 and a second end having a hook bolt 55 connected therebetween by a central frame 57. The eye bolt 54 provides a threaded shaft 63 extending to a looped end forming an eye 59 at an opposite distal end. The hook bolt 55 provides a threaded shaft 65 extending to an eye hook 61 at an opposite distal end. The threaded shafts of the respective eye bolt 54 and hook bolt 55 are screwed into corresponding opposing threads of the central frame 57 allowing the length of the eye bolt 54 and hook bolt 55 to be shortened or extended and for the tension of the turnbuckle 48 to be adjusted.

Figure 7:
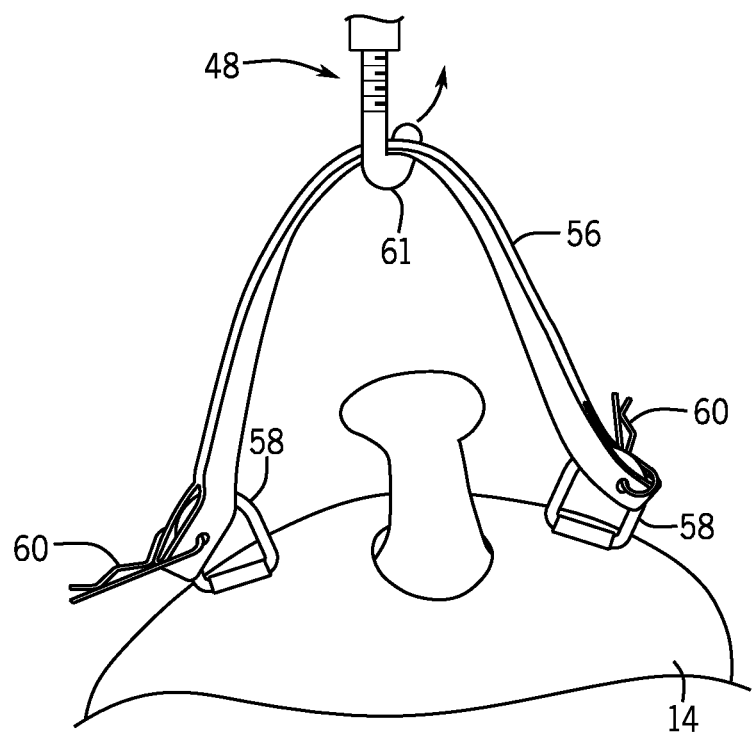
FIG. 7 is a rear perspective view showing the hook and eye turnbuckle inserted into the bridal brow band of the saddle to lift a front of the saddle.

Referring to FIGS. 4, 6, and 7, the eye 59 of the hook and eye turnbuckle 48 is looped around bolt 52 of the lower block housing 38. The eye hook 61 at the opposite end of the hook and eye turnbuckle 48 is configured to be hooked onto the bridal bow band 56 looped at the front end of the saddle 14. The front of the saddle 14 provides two breast collar D-rings 58 providing in oblong shape with a straight bottom edge attached to the saddle 14 and allowing the ends of the bridal bow band 56 to be coupled to the D-rings 58 by, for example, pin clips 60 extending through pin holes within the ends of the bridal bow band 56 and through the D-rings 58. In an alternative embodiment, the hook and eye turnbuckle 48 may be attached to the pommel horn at the front end of the saddle 14. The eye hook 61 is hooked such that the point of the hook 61 is directed toward a front end of the saddle 14. In this respect, the hook 61 is oriented so as to reduce damage to the saddle.

Figure 8:
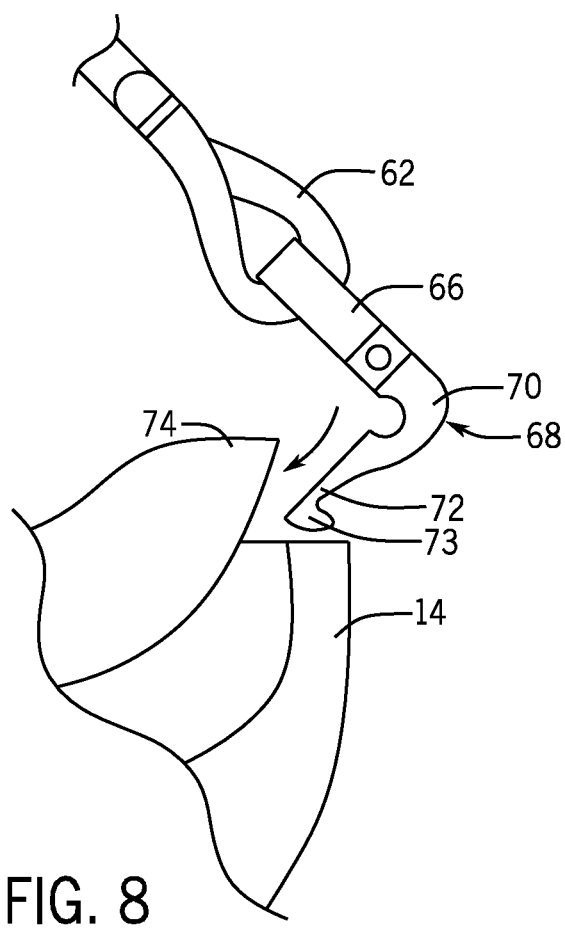
FIG. 8 is a side perspective view showing the truck hood inserted into the rear cantle binder of the saddle to lift a rear of the saddle.

Referring to FIGS. 4, 6, and 8, leather belt 62 is looped around bolt 52 of the lower block housing 38 and also connected to the truck hook 50 before being buckled to form a closed loop. The truck hook 50 provides a ring opening 64 allowing the leather belt 62 to loop therethrough. The truck hook 50 also provides an elongated shank 66 extending from the opening 64 and terminating at the distal end at hook 68. The hook 68 may be pivotable with respect to the elongated shank 66. The hook 68 is shaped to provide a bend 70 extending substantially perpendicular from the elongated shank 66 and having a front end 72 extending downwardly and away from the bend 70 to form a downwardly outward straight angled portion. A tip 73 of the front end 72 is then curved backwards to fold against itself to provide a smooth outer edge. The tip 73 is generally smooth to reduce damage to the saddle 14.

Referring now to FIGS. 1, 2, 3, 7, 8 and 9, in operation, the user 10 may position themselves near a saddling staging area sized to permit the horse 24 to stand proximate the saddle 14 and below the track 42. The user 10 may slide the block and tackle system 16 along the track 42 to place the lift system 80 above the saddle 14, for example, positioned on a saddle rack 110 or in a saddle storage area. The user 10 places the hook 61 into the bridal bow band 56 such that the point is facing toward a front end of the saddle 14 to provide inward tension at a front end of the saddle 14 toward the bend 70 and elongated shank 66 of the hook 61. The user 10 also places the truck hook 50 into a back end of the cantle binder 74 defined by an upwardly extending seat back at the rear end of the saddle 14 such that the point faces toward a front end of the saddle 14 and to provide inward tension at the rear end of the saddle 14 toward the tip 73 and bend 70 of the truck hook 50. The user 10 may be assisted by a second individual who helps to place the hook 61 into the bridal bow band 56 and the truck hook 50 into the back end of the cantle binder 74.

After the hooks are in place, the user 10 raises the saddle 14 by pulling the first end 28 of the rope 12 such that the lower block housing 38 is lifted toward the upper block housing 18. The weight of the saddle 14 places downward forces on the hook and eye turnbuckle 48 and the leather belt 62/truck hook 50 such that an inward tension is created toward a center point between the hook 61 and truck hook 50 of the saddle 14.

Figure 9:
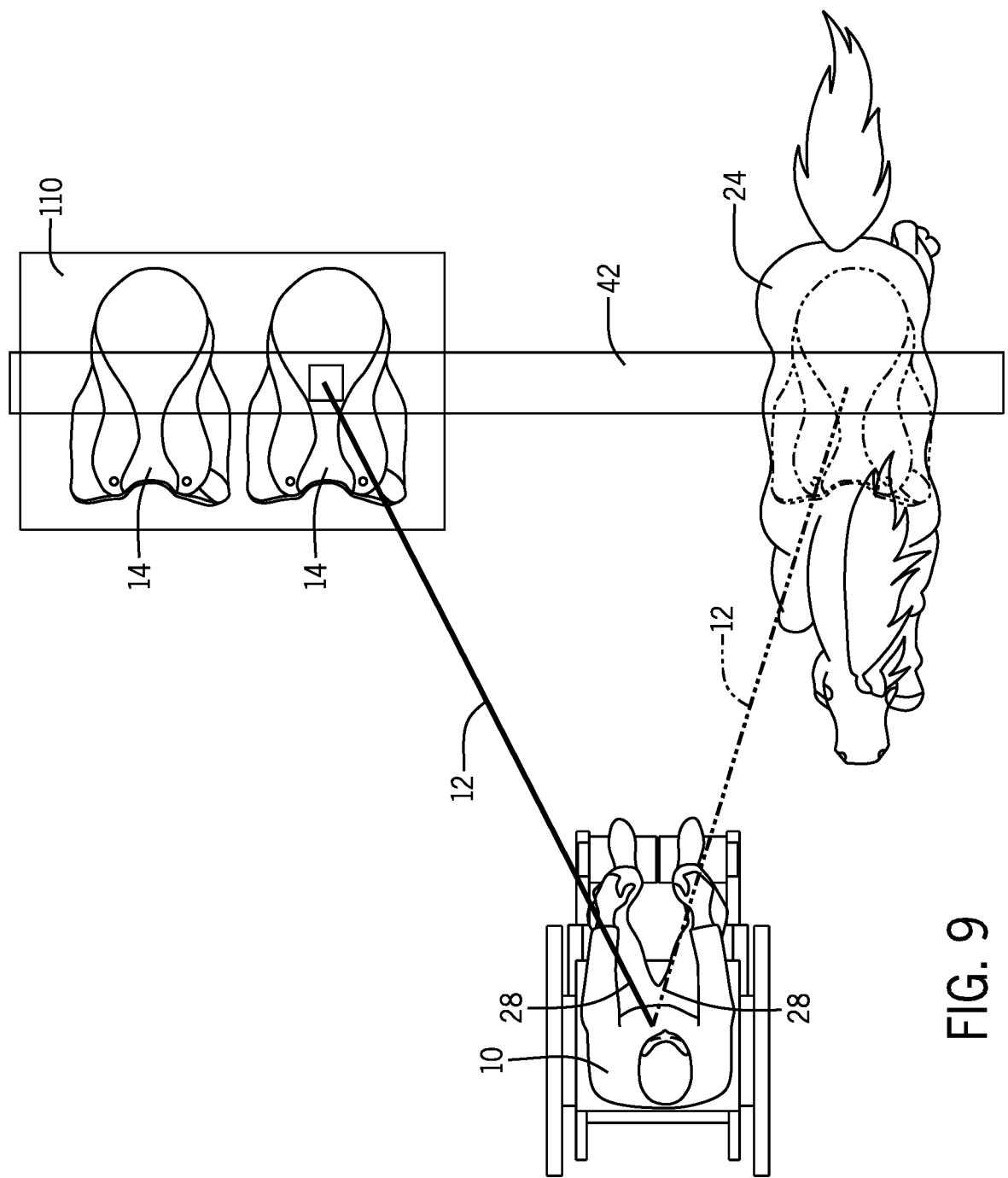
FIG. 9 is a simplified top plan view of the user using the lift system along a rail to maneuver saddles from a saddle rack to the horse.

Referring specifically to FIG. 9, the user 10 may position their body with respect to the track 42 so that a vector of the user 10 to the block and tackle system 16 is at an angle that is substantially perpendicular or between 45 and 90 degrees with respect to an axis formed along a length of the track 42. In this respect, pulling the first end 28 of the rope will not allow the sliding carriage 44 to easily slide along the track 42. Alternatively, the user 10 may utilize a locking mechanism to prevent the sliding carriage 44 from sliding along the track 42 during saddle 14 lift or lowering.

Referring again to FIGS. 1, 2, 3, 7, 8 and 9, the user 10 continues to lift the saddle 14 to a height clearing a height of the back of the horse 24. The user 10 may be assisted by the cam 19 allowing the user 10 to lift the saddle 14 in increments while resting in between without the saddle 14 lowering.

One the saddle 14 is lifted to a desired height, the sliding carriage 44 may then be slid along the track 42 to a position above the horse 24 and allowing the saddle 14 to be placed onto the back of the horse 24 when lowered.

Figure 2:
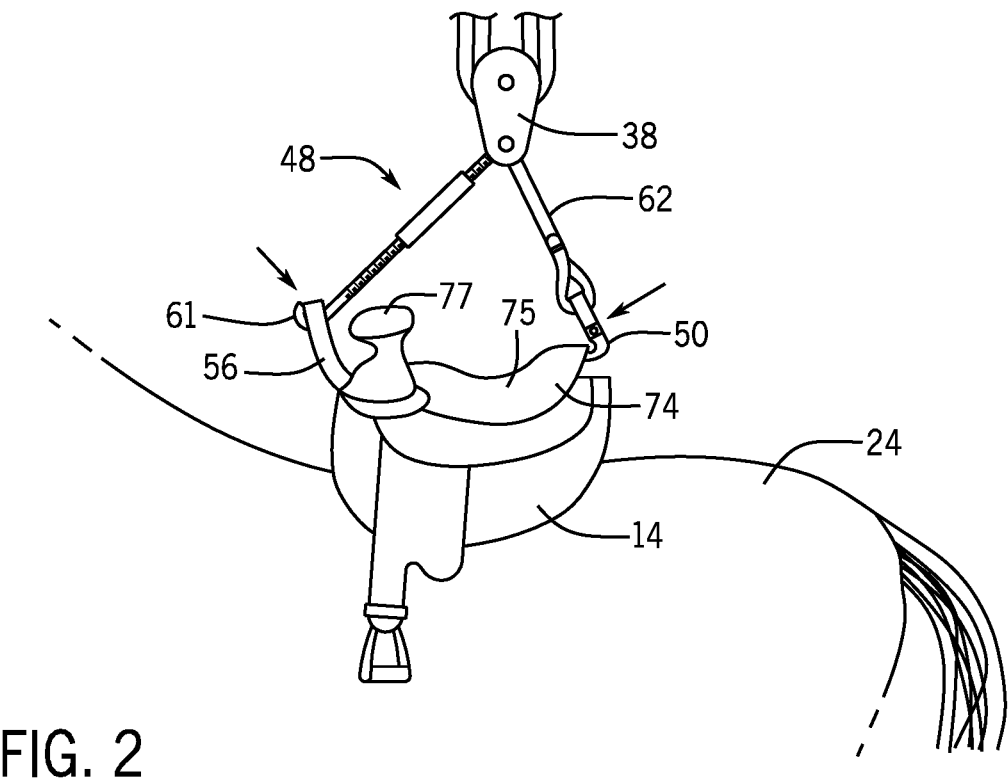
FIG. 2 is a simplified side elevation view of the hook and eye turnbuckle attached to a front bridal brow band of the saddle and a truck hook attached to a rear cantle binder of the saddle and the saddle lifted above the horse.

Referring to FIG. 2, once the saddle 14 is directly above the back of the horse 24, facilitated by movement of the wheel 102 along the track 42 and pivoting motion permitted by the wheel 102 to define a proper positioning, the user 10 releases length at the first end of the rope 12 to lower the lower block housing 38 and saddle 14 onto the back of the horse 24. Again, the user 10 may be assisted by a second individual who helps to position the saddle 14 on the back of the horse 24.

Figure 3:
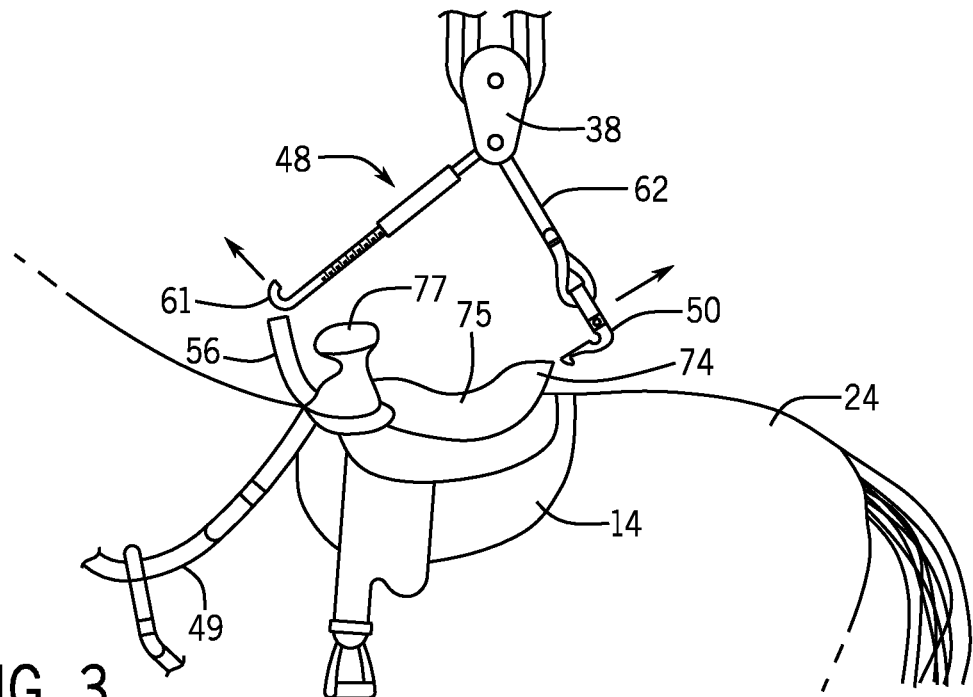
FIG. 3 is a simplified side elevation view of the saddle resting on the horse and the hook and eye turnbuckle released from the front bridal brow band of the saddle and the truck hook released from the rear cantle binder of the saddle.

Referring to FIG. 3, once the saddle 14 is lowered and resting on the horse 24, the weight of the saddle 14 is released from the hook and eye turnbuckle 48 and the leather belt 62/truck hook 50 reducing the downward and inward tension on the hooks. The stiff bridal bow band 56 maintains its position allowing the hook 50 to be released from the bridal bow band 56. Release of the hook 61 releases the opposing tension on truck hook 50 allowing the truck hook 50 to be released from the cantle binder 74. The automatic release of the hooks 61, 50 allows the lift system 80 to be removed from the horse 24 without human intervention and discomfort to the horse 24.

Referring to FIGS. 3 and 7, the front end of the saddle 14 may also support connection of the breast collar 49 coupled to the pair of D-rings 58 at opposite sides of the front of the saddle 14 and wrapping around the across the horse's shoulders just below the horse's neck. A Y-style breast collar 49 may include a strap that extends between the horse's front legs. The breast collar 49 aides in keeping the saddle 14 in place and preventing side to side and back and front movement.

The lift system 80 may also be used to remove the saddle 14 from the horse 24 in a similar manner whereby the user 10 places the hooks 50, 61 into the saddle 14 and raises the saddle 24 to unsaddle the horse 24 and replace the saddle 14 into the saddle rack 110.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What is claimed is:

1. A method of assisting individuals with special needs with saddling a horse during equine-assisted therapy, the method comprising the steps of:
   (a) positioning a horizontal track above a staging area sized to accommodate a standing horse and with one end of the track positioned near a saddle storage area holding a saddle, the track having a sliding carriage movable along the track, the sliding carriage supporting a block and tackle having an upper pulley attached to the sliding carriage and a lower pulley attached to a pair of pendant hooks;
   (b) maneuvering the sliding carriage over the saddle storage area and lowering the block and tackle so that the hooks may engage with the saddle in the saddle storage area;
   (c) raising the saddle using the block and tackle;
   (d) positioning the sliding carriage over the standing horse in the staging area and lowering the block and tackle to position the saddle on the horse; and
   (e) disengaging the hooks from the saddle; wherein
   an individual with special needs operates the block and tackle.

2. The method of claim 1, wherein steps (b)-(c) are accomplished by an individual holding a single rope of the block and tackle.

3. The method of claim 2, wherein the upper pulley includes a cam and further comprising the step of passing the single rope through the cam to allow movement of the single rope in one direction and prevent movement of the single rope in an opposite direction.

4. The method of claim 1, further comprising the step of attaching a strap between breast collar D rings of the saddle to form a loop, wherein the loop is configured to receive at least one of the hooks.

5. The method of claim 1, wherein a front hook of the pair of pendant hooks is positioned near a front of the saddle and oriented with a point of the front hook directed outward with respect to a center of the saddle.

6. The method of claim 5, wherein a rear hook of the pair of pendant hooks is positioned near a rear of the saddle and oriented with a point of the rear hook directed toward the center of the saddle.

7. The method of claim 6, wherein the rear hook comprises a shank extending along a first axis and curving along an axis perpendicular to the first axis, and the point is bent backward toward the shank along an outer edge of the hook.

8. The method of claim 6, where the rear hook is sized to engage a rear edge of a cantle of the saddle.

9. The method of claim 1, wherein points of the pair of hooks are oriented in a same direction when hooked onto the saddle.

10. The method of claim 1, wherein the pair of hooks are coupled to the block and tackle at a common axis.

11. The method of claim 10 further comprising the step of adjusting a distance between at least one of the hooks and the common axis.

12. The method of claim 1, wherein a weight of the saddle produces an inward force between the pair of hooks when the saddle is lifted.

13. The method of claim 1, wherein the individual with special needs is in a wheelchair.

14. A method of assisting individuals with special needs with saddling a horse during equine-assisted therapy, the method comprising the steps of:
   (a) positioning a horizontal track above a staging area sized to accommodate a standing horse and with one end of the track positioned near a saddle storage area holding a saddle, the track having a sliding carriage movable along the track, the sliding carriage supporting a block and tackle having an upper pulley attached to the sliding carriage and a lower pulley attached to a pair of pendant hooks;
   (b) positioning an individual with special needs who is operating of the block and tackle with respect to the track such that a vector formed by the individual holding a single rope of the block and tackle is 45 to 90 degrees with respect to an axis formed by a length of the track;
(c) maneuvering the sliding carriage over the saddle storage area and lowering the block and tackle so that the hooks may engage with the saddle in the saddle storage area;
(d) raising the saddle using the block and tackle;
(e) positioning the sliding carriage over the standing horse and lowering the block and tackle to position the saddle on the horse; and
(f) disengaging the hooks from the saddle; wherein
steps (c)-(d) are accomplished by the individual holding the single rope of the block and tackle.

\* \* \* \* \*